(12) United States Patent
Wilde et al.

(10) Patent No.: US 8,757,550 B2
(45) Date of Patent: Jun. 24, 2014

(54) METHOD AND APPARATUS FOR COOLING FUEL IN AN AIRCRAFT FUEL TANK

(75) Inventors: Andrew Wilde, Bristol (GB); Jean-Claude Bossut, Cornebarrieu (FR); Marc Revel, Saint Genies Bellevue (FR); Alan John Hayles, Bristol (GB); Ruchir Dayal, Bristol (GB); Hannah Kendall, Bristol (GB)

(73) Assignees: Airbus Operations Limited, Bristol (GB); Airbus Operations SAS, Toulouse Cedex (FR)

( * ) Notice: Subject to any disclaimer, the term of this patent is extended or adjusted under 35 U.S.C. 154(b) by 404 days.

(21) Appl. No.: 12/786,474

(22) Filed: May 25, 2010

(65) Prior Publication Data

US 2011/0290943 A1    Dec. 1, 2011

(51) Int. Cl.
| | | |
|---|---|---|
| *B64D 15/04* | (2006.01) | |
| *B64D 15/16* | (2006.01) | |
| *B64F 5/00* | (2006.01) | |
| *B64D 37/04* | (2006.01) | |
| *B64D 37/32* | (2006.01) | |
| *B64D 37/02* | (2006.01) | |
| *B64D 37/06* | (2006.01) | |

(52) U.S. Cl.
CPC ............... *B64D 37/04* (2013.01); *B64D 37/32* (2013.01); *B64D 37/02* (2013.01); *B64D 37/06* (2013.01)
USPC ..................................................... 244/135 R

(58) Field of Classification Search
CPC ........ B64D 37/04; B64D 37/32; B64D 37/02; B64D 37/06
USPC ...................... 244/53 B, 135 A, 135 R, 57, 58
See application file for complete search history.

(56) References Cited

U.S. PATENT DOCUMENTS

| | | | | |
|---|---|---|---|---|
| 4,776,536 | A * | 10/1988 | Hudson et al. ............ | 244/135 R |
| 6,343,465 | B1 | 2/2002 | Martinov | |
| 7,152,635 | B2 * | 12/2006 | Moravec et al. ................ | 141/64 |
| 7,300,494 | B2 * | 11/2007 | Schwalm et al. ................. | 95/54 |
| 2003/0127559 | A1 * | 7/2003 | Walmsley .................... | 244/23 C |
| 2008/0053101 | A1 * | 3/2008 | Schwarz .......................... | 60/772 |
| 2010/0096118 | A1 * | 4/2010 | Scherer et al. ................. | 165/253 |

* cited by examiner

*Primary Examiner* — Valentina Xavier
(74) *Attorney, Agent, or Firm* — Lowe Hauptman & Ham, LLP

(57) ABSTRACT

Fuel in an aircraft fuselage fuel tank is cooled by means of cold air flowing from the exterior of the aircraft to a cooling region inside the aircraft. The cooling region may be (a) located to the exterior of the fuel tank, (b) in thermal communication with the fuel tank and (c) in fluid communication with a region downstream of, and remote from, said cooling region, for example, an exhaust port on the outside of the aircraft. The flow of air may be caused by air entering a ram air intake, into which air passes as a result of the motion of the airborne aircraft relative to the surrounding air.

16 Claims, 4 Drawing Sheets

METHOD AND APPARATUS FOR COOLING FUEL IN AN AIRCRAFT FUEL TANK

BACKGROUND OF THE INVENTION

The present invention concerns an aircraft having a fuselage fuel tank, a method of reducing fuel flammability in a fuselage fuel tank, and an aircraft fuselage for use with such an aircraft or for use in such a method.

The aircraft industry is continuously looking to improve aircraft safety and to make commercial aircraft flight an even safer way of travelling. One area of activity in this field is increasing safety in fuel tanks by reducing in-tank flammability of fuel. In this regard, it should also be noted that Regulations of the US Federal Aviation Administration (FAA), for example FAR 26.33, set out certain criteria that certain aircraft types will need to comply with.

One method of reducing in-tank fuel flammability is to incorporate an inerting system in the aircraft, whereby the oxygen content in the ullage (the air space in the fuel tank) is reduced. One such inerting system works by injecting inert gases from bottles stored on the aircraft. Another proposal involves generating a nitrogen rich air supply from engine bleed air and air separation devices.

U.S. Pat. No. 6,343,465 discusses a method of improving safety in fuel tanks by effectively sucking out vapour in the fuel tank, or air around the fuel tank, by means of suction created at the engine air intake area. The removed vapour/air is replaced with atmospheric air and/or mechanically cooled cabin-air.

The above proposal and concerning the inerting system requires exchange of gaseous fluids within the interior of the fuel tanks, as does one of the proposals of U.S. Pat. No. 6,343,465. These two proposals appear to be alternatives. It would appear that inerting the ullage is not compatible with the method of U.S. Pat. No. 6,343,465 in which fumes are continuously drawn from the fuel tanks for combustion in the engines, whilst introducing a stream of cooled air with a normal oxygen content. The proposals of U.S. Pat. No. 6,343,465 all rely on using the engine to provide suction, which must necessarily reduce engine efficiency. Vapour/air in and around the fuel tanks if used during the air compression stage of a jet engine would also pollute such compressed air with fuel vapour. Such compressed air could not then be used for cabin air conditioning. Moreover, for the proposals of U.S. Pat. No. 6,343,465 to be practical and safe, there would need to be a sophisticated control system to control air pressure, air flow rates and demand on the engine and/or air conditioning units providing the mechanically cooled air.

It has been shown that, during flight, the temperature of fuel in tanks in the wings of an aircraft is typically significantly lower than the temperature of fuel in tanks in the fuselage. The wings are more exposed to airflow, which at cruising altitude tends to be rather cold. The fuel in the wing tanks is therefore kept relatively cool by means of the cooling effect provided by such cold air passing over the wings. Fuel in tanks in the fuselage tend to be less exposed to the airflow. Parts of the fuel tanks are near the interior of the fuselage, where temperatures need to be warmer in view of passenger comfort. The fuselage may also include systems that generate heat, such as for example air conditioning units used for conditioning cabin air. In some aircraft, one or more air conditioning units are located directly adjacent to the fuselage fuel tanks.

The present invention seeks to provide an alternative or improved method or apparatus for reducing fuel flammability in a fuselage fuel tank. Additionally or alternatively, the present invention seeks to provide an alternative or improved method or apparatus for cooling fuel in a fuselage fuel tank. Additionally or alternatively, the present invention seeks to mitigate one or more of the problems or disadvantages mentioned above.

SUMMARY OF THE INVENTION

The present invention provides, according to a first aspect, an aircraft comprising (i) a fuselage fuel tank, (ii) an external surface in which there is provided a ram air intake, and (iii) an air supply passage extending from the ram air intake to a cooling region. Said cooling region is (a) located to the exterior of the fuel tank, (b) in thermal communication with the fuel tank and (c) in fluid communication with a downstream region said downstream region being downstream of, and remote from, said cooling region. In use, during flight, air flows from the exterior of the aircraft via said cooling region. The fuel tank may thus be cooled during flight by means of such an air flow. An embodiment of the invention provides a lightweight, simple and passive means for cooling fuel in a fuselage fuel tank, thereby reducing fuel flammability in the fuel tank and therefore improving safety. No moving parts or control systems are required in such an embodiment. No suction is required in order to provide the cooling air flow in such an embodiment.

The "cooling region" (the region via which cooling air may pass for cooling the fuel tank) may be defined by a cavity beneath the fuel tank. Such a cavity may provide extra thermal insulation between the fuel tank and a heat source beneath the cavity. Arranging for air to flow via such a cavity may also allow for any fuel vapour that may collect outside of the fuel tank wall to be exhausted out of the fuselage.

According to a second aspect of the invention there is also provided a method of reducing fuel flammability in a fuselage fuel tank of an airborne aircraft. During performance of the method, air flows from the exterior of the aircraft to a region inside the aircraft but outside the fuselage fuel tank in which region it cools said fuselage fuel tank. The air may then be exhausted, preferably to atmosphere. The air may be caused to flow from the exterior of the aircraft to the region inside the aircraft by means of air being collected via a ram air intake, such as a NACA duct, on an exterior surface of the aircraft. As such, an embodiment of this second aspect of the invention provides a completely passive means for cooling fuel in a fuselage fuel tank in an airborne aircraft.

When an aircraft is manufactured, the fuselage can be manufactured separately from the wings. The wings and fuselage may be assembled at locations different from the location of manufacture. The present invention thus provides, according to a third aspect of the invention, an aircraft fuselage for an aircraft of the first aspect of the invention or for use in the method of the second aspect of the invention. The aircraft fuselage of this third aspect of the invention comprises a fuel tank, and an air supply passage extending from an air intake region, for example a ram air intake, via a downstream cooling region, to a downstream region (for example an air exhaust outlet) downstream of, and remote from, said cooling region. The aircraft fuselage of this third aspect of the invention may be provided without wings.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
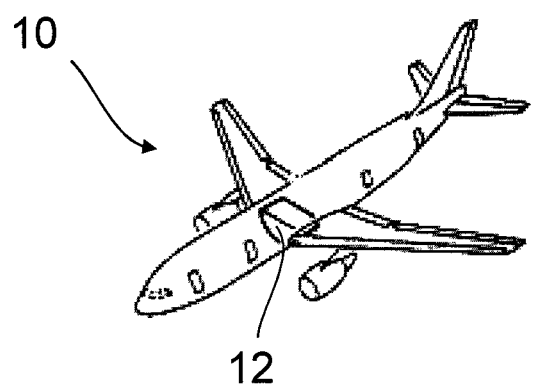
FIG. 1 shows a perspective view of an aircraft according to a first embodiment of the invention.
Figure 2A:
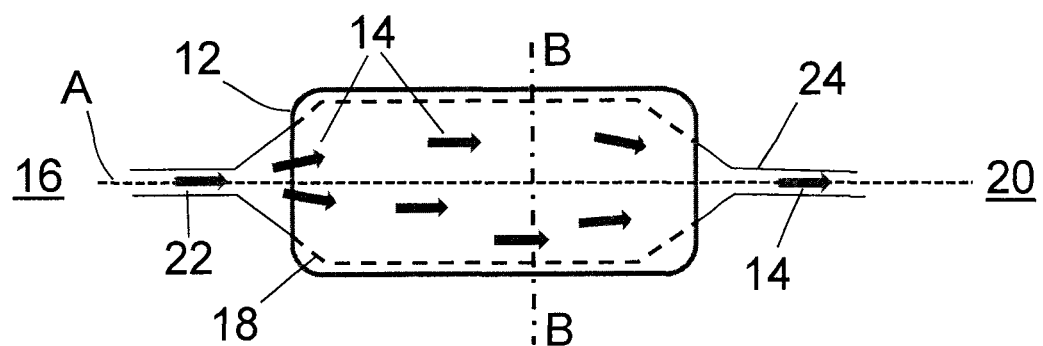
FIG. 2a shows a cut-away plan view of a fuel tank of the aircraft shown in FIG. 1.
Figure 2B:
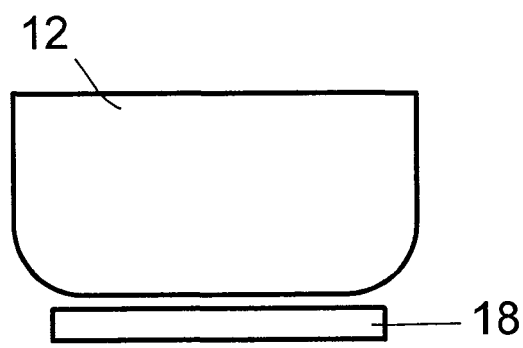
FIG. 2b shows a sectional view of the fuel tank of FIG. 2a taken along the plane B-B.

FIGS. 1, 2a and 2b illustrate highly schematically a first embodiment of the invention. FIG. 1 shows an aircraft comprising a fuselage fuel tank 12. FIG. 2a shows the fuel tank in plan view with the axis A of the fuselage also shown. FIG. 2b shows a sectional view of fuselage fuel tank 12 taken about the cross-section B-B shown in FIG. 2a. Fuel in the fuselage fuel tank 12 is cooled by means of an airflow 14 resulting from cold air being drawn from the exterior of the aircraft. The air flows from an air inlet, shown schematically in FIG. 2a by reference numeral 16, to a cooling region 18, located to the exterior of the fuel tank 12. The air inlet 16 may be provided on the fuselage, but may in other embodiments of the invention be provided at other locations on the aircraft 10. The cooling region 18 is in thermal communication with the fuel tank 12 thus allowing the airflow to cool the fuel in the fuel tank 12. Cooling the fuel in this way reduces the fuel flammability in the fuselage fuel tank 12. The air flows from the cooling region 18 to an air exhaust, shown schematically in FIG. 2a by reference numeral 20.

The airflow from the inlet 16 to the outlet 20 via the cooling region 18 may conveniently be caused by means of air passing into a ram air intake, located on an external surface of the fuselage for example, as a result of the motion of the aircraft relative to the surrounding air. The ram air intake is connected to an upstream passageway 22 that passes to the cooling region 18 adjacent to the fuel tank. A downstream passageway 24 may be provided to allow air to flow from the cooling region 18 to an air exhaust port, which may also be located on an external surface of the aircraft.

Figure 3:
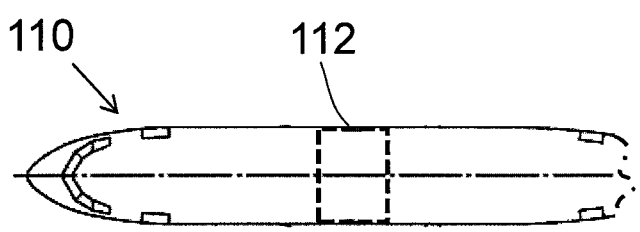
FIG. 3 shows a plan view of an aircraft fuselage according to a second embodiment of the invention.
Figure 4:
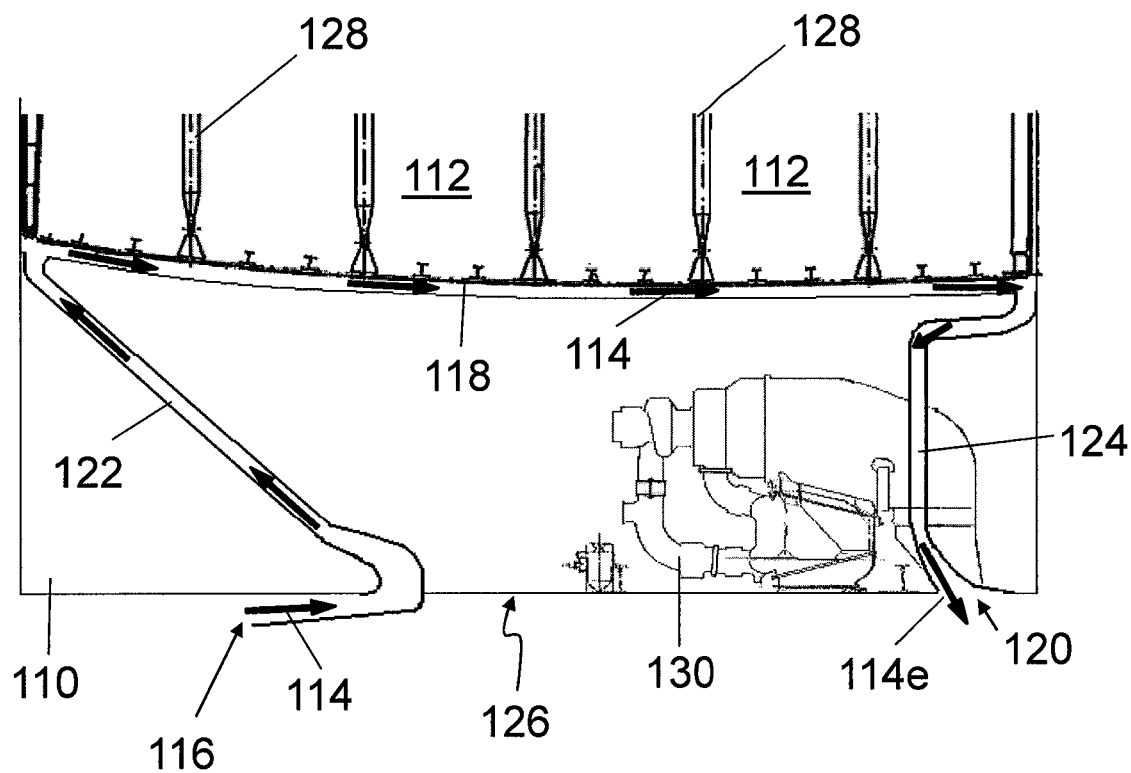
FIG. 4 shows a sectional side view of a fuel tank of the aircraft shown in FIG. 3.

FIGS. 3 and 4 illustrate a second embodiment of the invention. FIG. 3 shows an aircraft fuselage 110 comprising a fuselage fuel tank 112. FIG. 4 shows a sectional view of fuselage fuel tank 112 taken about a vertical plane parallel with the longitudinal axis of the fuselage. FIG. 4 shows the external surface 126 of the underneath of the fuselage 110 and the frame members 128 that make up the supporting structure (or frame) of the fuselage 110. A ram air intake 116, in the form of a NACA duct (illustrated schematically in FIG. 4), is provided on an external surface 126 of the fuselage 110. An air supply passage 122 extends from the ram air intake 116 to a cooling region, in the form of a cavity 118 immediately adjacent to and beneath the fuel tank 112. The wall (fuel tank wall) dividing the cavity 118 from the fuel tank 112 is shared. As a result, the cavity 118 is in thermal communication with the fuel tank 112. The cavity 118 leads to a downstream passageway 124, in the form of an air exhaust passage, that leads to an exhaust port 120, which is conveniently in the form of a NACA duct (illustrated schematically in FIG. 4). The exhaust port 120 is thus (a) in fluid communication with the cavity 118, (b) downstream of the cavity 118, and (c) remote from the cavity 118. The exhaust port 120 is conveniently provided on an external surface 126 of the fuselage 110, but may be provided at other locations on the aircraft. The exhaust air is thus conveniently exhausted to atmosphere (see arrow labelled 114e).

In use, during flight of the aircraft, cold air 114 flows into the ram air intake 116, from the exterior of the aircraft, via the cavity 118, thereby cooling fuel in the fuel tank. The flammability of the fuel in the tank is therefore reduced. Typically external air at cruising altitude is at temperatures of the order of −40° C. or below. The airflow may cool fuel in the fuel tank both by means of convection and conduction.

The ram air intake 116 is located on the underside of the fuselage 110. The ram air intake 116 may be located on the fuselage 110 at a position that is beneath the fuel tank 112. It will be understood that the ram air intake 116 could be located beneath the fuel tank 112 only in the sense that the vertical position of the ram air intake 116 is lower than the bottom of the fuel tank 112. The ram air intake 116 could be in the form of an air scoop.

The fuel tank 112 may be defined by one or more fuel tank walls. The cooling region, in the form of the cavity 118 in this embodiment, may be in direct thermal communication with a fuel tank wall. The cooling region is preferably directly adjacent to a tank wall.

The upstream, inlet, air passageway 122 may widen in the direction towards the cavity 118. The cavity 118 may have a cross-sectional area that is greater than the average cross-sectional area of the upstream passageway 122, the cross-sectional areas being taken such that the direction of the airflow is perpendicular to the section taken.

The cavity 118 may extend across the majority of the footprint of, and preferably substantially the entire width and length of, the fuel tank 112. The cavity 118 may provide thermal insulation, by means of the air-gap thereby defined, between the fuel tank 112 and a heat source. Such a heat source is shown in FIG. 4, where there is shown an air conditioning unit 130. Thermal insulation (in addition to or instead of that afforded by the air gap) may be provided by means of a layer of thermally insulating material, provided beneath the cavity.

Preferably, substantially all of the cooling air used to cool fuel in the fuel tank flows outside of the fuel tank. In the event that fuel vapour escapes from the fuel tank, the continual flow of cooling air past the exterior of the fuel tank may advantageously remove such fuel vapour and exhaust it appropriately and in a controlled manner. A fuel vapour seal may be provided around the cavity to capture such vapour in the cavity. Such a fuel vapour seal may also at least partially envelope the fuel tank 112.

The flow of air to and from the cavity 118 is preferably caused primarily, and more preferably solely, by means of the energy of the air entering the aircraft, or the pressure difference created (for example as between the pressure of air at the ram air intake and the pressure downstream at the air exhaust port), as a result of the relative motion between the aircraft and the atmosphere.

The aircraft may comprises one or more engines, at least one of which feeding compressed air to an air-conditioning unit for supplying air to the cabin.

The embodiments of the invention mentioned above may be used with a fuel inerting system, but may also be used without an inerting system.

Embodiments of the invention may be of greater application to larger commercial aircraft, particularly passenger-carrying aircraft, where safety of the aircraft is of the utmost importance. The aircraft fuselage preferably of a size suitable for carrying more than 50 passengers, and more preferably more than 100 passengers. The empty weight of the aircraft is preferably greater than 20,000 tonnes, and may be greater than 50,000 tonnes. The aircraft may have a maximum payload capacity that is 5 tonnes or more.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Whilst the above-described air-flow regime may operate entirely passively, with airflow being generated only as a result of the movement of the aircraft relative to the surrounding air, in other embodiments there may be provided additional, non-passive, means for assisting or controlling airflow.

Air flowing from the cavity or cooling region beneath the tank may be mixed with air from other regions of the aircraft, for example air from the cabin, before being exhausted to atmosphere.

The cooling region may include a plurality of ducts, for example channels or the like, to direct cooling air along a plurality of paths adjacent to the fuel tank. Such paths may be spaced apart and span across substantially the entire width of the fuel tank. The cavity mentioned above may accommodate such ducts. Providing ducts in this matter facilitates better distribution of cooling air and therefore more efficient cooling of the fuel tank. Without such ducts, the air might otherwise travel along a path of least resistance, and not be spread across a large proportion of the surface area corresponding to the footprint of the fuel tank.

The air intake duct and/or the air exhaust duct may be located on a part of the aircraft other than the exterior of the fuselage.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising:
a fuselage fuel tank having a tank wall,
the aircraft having an external surface which is located on a fuselage or on a lower surface of a fixed-wing of the aircraft, a ram air intake disposed on said external surface, and
an air supply passage extending from the ram air intake to a cooling region, said cooling region being (a) located to the exterior of the fuel tank and directly adjacent to the tank wall, (b) in thermal communication with the fuel tank and (c) in fluid communication with a downstream region downstream of, and remote from, said cooling region,
whereby in use, during flight, air flows from the exterior of the aircraft via said cooling region thereby cooling the fuel tank.

2. An aircraft according to claim 1, wherein the ram air intake is located on the fuselage at a position beneath the fuel tank.

3. An aircraft according to claim 1, wherein the fuselage includes a cavity immediately beneath the fuselage fuel tank, and the air supply passage is arranged to be in fluid communication with the cavity.

4. An aircraft according to claim 3, wherein said cooling region is at least partly defined by at least part of said cavity.

5. An aircraft according to claim 3, wherein said cavity has a cross-sectional area that is greater than the average cross-sectional area of the passage upstream of the cavity.

6. An aircraft according to claim 3, wherein beneath the cavity there is provided a heat source.

7. An aircraft according to claim 6, wherein the heat source is an air conditioning unit.

8. An aircraft according to claim 1, wherein the fuselage comprises an air exhaust passage extending to an exhaust port on an external surface, the air exhaust passage being downstream of and in fluid communication with said downstream region.

9. An aircraft according to claim 1, wherein the cooling region and the fuel tank are at least partially enveloped by a fuel vapour seal, so that fuel vapour, if any, outside the fuel tank and in the cooling region may be removed by means of air flowing via the cooling region.

10. An aircraft fuselage for an aircraft according to claim 1, wherein the aircraft fuselage comprises
a fuel tank, and
an air supply passage extending from an air intake region, via a downstream cooling region, to a downstream region downstream of, and remote from, said cooling region.

11. An aircraft fuselage according to claim 10, further including an external surface in which there is provided a ram air intake which defines said air intake region.

12. A method of reducing fuel flammability in a fuselage fuel tank of an airborne aircraft, the airborne aircraft having one or more external surfaces defining at least one of a fuselage and a fixed wing, wherein the method comprises the following steps:
providing a cooling region located to the exterior of the fuselage fuel tank and directly adjacent to a tank wall;
causing air to flow (i) from the exterior of the aircraft, (ii) via a ram air intake disposed on said one or more external surfaces, (iii) to said cooling region at which the air cools said fuselage fuel tank, and
then exhausting the air.

13. A method according to claim 12, wherein the step of exhausting the air is performed by exhausting to atmosphere.

14. A method according to claim 12, wherein fuel vapour is removed by means of the air flow.

15. A method according to claim 12, wherein the step of causing air to flow in order to cool said fuselage fuel tank, uses the energy of the air entering the aircraft, or the pressure difference created, as a result of the relative motion between the aircraft and the atmosphere.

16. A method of reducing fuel flammability in a fuselage fuel tank of an airborne aircraft, comprising:
causing air to flow from the exterior of the aircraft via an external surface of the aircraft in which there is provided a ram air intake, through an air supply passage extending from the ram air intake to a cooling region, said cooling region being located to the exterior of the fuel tank, and from said cooling region to a region located downstream of, and remote from, said cooling region, and cooling the fuel in the fuselage tank by thermal conduction of heat from the fuel in the fuselage fuel tank to the air in the cooling region via the fuselage tank itself, and wherein the method is performed such that air is caused to flow from the exterior of the aircraft via said external surface primarily by means of at least one of (a) the inherent energy of the air to the exterior of the aircraft resulting from the relative motion between the whole aircraft and the atmosphere and (b) the pressure difference created as a result of the relative motion between the whole aircraft and the atmosphere.

* * * * *